3,037,520
VALVE
Joseph Thomas, 6251 Calhoun St., Detroit, Mich.
Filed July 8, 1958, Ser. No. 747,290
5 Claims. (Cl. 137—270)

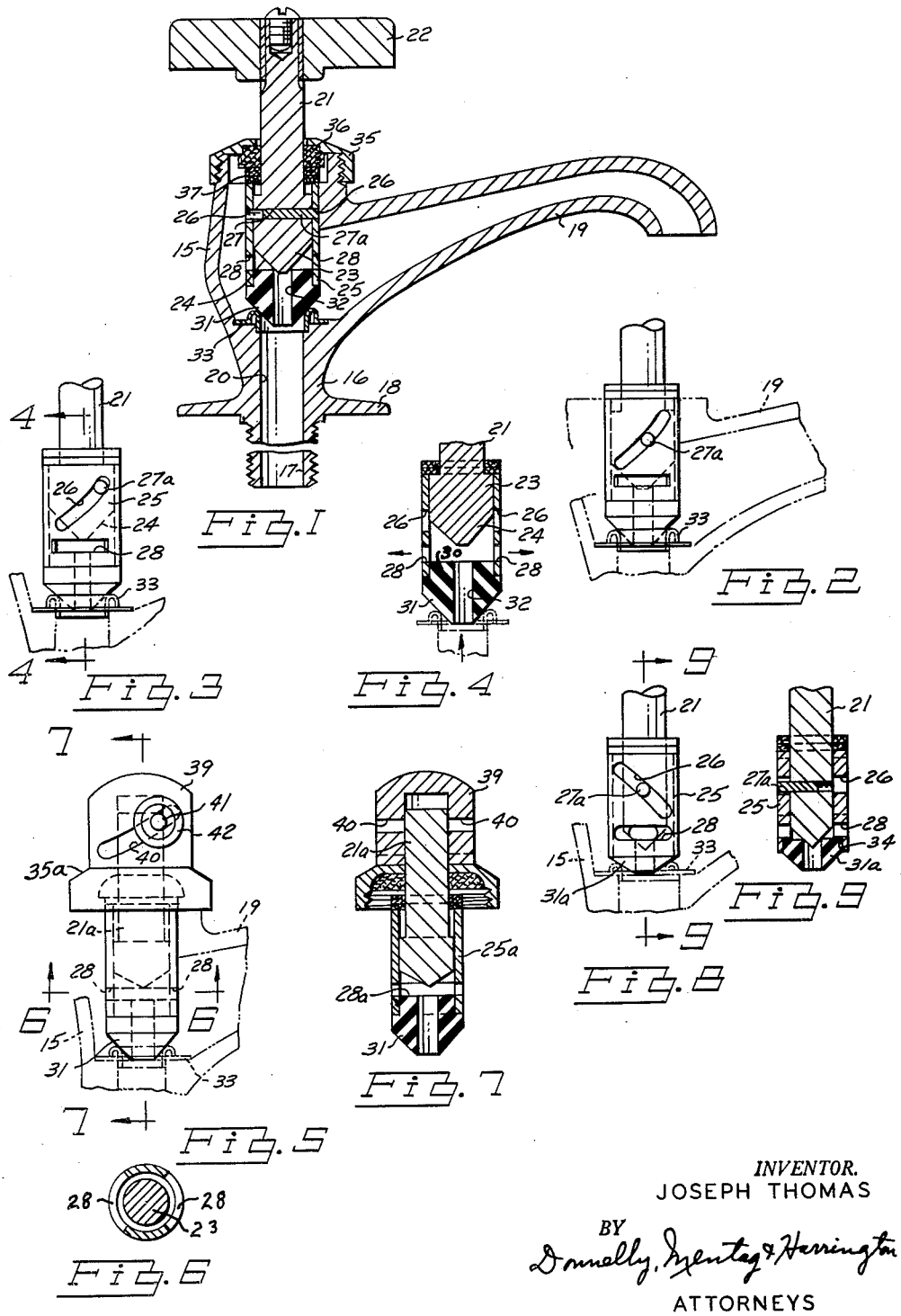

My invention relates to a new and useful improvement in a faucet valve mechanism for controlling the flow of liquid.

It is an object of the present invention to provide a valve mechanism which will be durable, compact and highly efficient in use.

Another object of the invention is the provision of a mechanism having a yieldable seating member and provided with a metallic seating member for engaging the yieldable seating member while at the same time the yieldable seating member is not disturbed in its engagement with its seat.

Other objects will appear hereinafter.

It is recognized that various modifications and changes may be made in the detail of the structure illustrated without departing from the invention and it is intended that the present disclosure shall be considered but the preferred embodiment.

Forming a part of this application are drawings in which,

FIG. 1 is a central sectional view of the faucet showing the invention applied,

FIG. 2 is a fragmentary elevational view of the invention,

FIG. 3 is a view similar to FIG. 2 taken from the obverse side,

FIG. 4 is a fragmentary sectional view taken on line 4—4 of FIG. 3,

FIG. 5 is an elevational view of a modification of the valve mechanism,

FIG. 6 is a sectional view taken on line 6—6 of FIG. 5,

FIG. 7 is a sectional view taken on line 7—7 of FIG. 5,

FIG. 8 is an elevational view of a slight modification of the valve mechanism,

FIG. 9 is a sectional view taken on line 9—9 of FIG. 8.

In the drawings I have illustrated a faucet which is used to control the flow of liquid and which embodies a housing 15 projecting downwardly from which is a neck 16 terminating in a threaded portion 17 which may be connected to the source of water supply. Projecting outwardly from this neck 16 is a flange 18 which is adapted to bear on the service facility, such as a wash stand or the like. Extending outwardly from the housing 15 is the delivery spout 19 to deliver water passing from the passage 20. A valve stem 21 is provided with a hand-hold or grip 22. A valve head 23 is formed on the terminal portion of the valve stem 21 and is provided with a conical seating portion 24.

The valve head 23 extends into a sleeve 25 which is provided in opposite sides with spirally directed slots 26. These spirally directed slots are in diametric alignment.

Mounted in the transverse hole 27 in the stem 21 is a pin 27a which may be moved axially in one direction into one of the slots 26, or may be moved axially to project into the other slot 26. By moving the pin into one slot or the other, the mechanism may be accommodated for a left-hand thread or a right-hand thread.

Formed in the sleeve 25 adjacent to the lower end are oppositely disposed outlet slots 28 through which the water passing through the passage 20 may enter the housing 15 and outwardly through the spout 19.

Mounted in the lower end of the sleeve 25 is the reduced neck 30 of a flexible sealing plug 31 preferably made from a composition rubber which is provided with a conical terminal portion providing a valve head engaging the valve seat 33 mounted in the housing 15 at the end of the passage 20. The passage 32 is formed through the valve head 31 to permit the flow of liquid outwardly from the barrel or sleeve 35 through the openings 28.

Threaded on the upper end of the housing 15 is a nut 35 in which is positioned a suitable packing 36 and which bears against washers 37 so that the barrel or sleeve 35 is held in rigid position with the valve head 31 in sealing contact with its seat 33.

In operation the rod of the stem 21 will effect a longitudinal movement of the stem thus moving the head 23 toward and away from the member 31. This movement is effected through the engagement of the pin 27a in the spirally directed slot 26. It will be noted that the flexible sealing member 31 remains stationary and in firm contact with its seat 33 at all times so that wear on the seat portion 33 is avoided. This results in a prolonged life of the member 33.

When it is desired to replace the member 31, it is but necessary to remove the nut 35 and then the stem 21 and the sleeve 25 with the associated parts may be removed from the housing 15.

The structure shown in FIG. 8 and FIG. 9 is the same as already described except the plug or sleeve head 31a is not provided with a reduced neck portion 30, but the sleeve or barrel 25 is cut away, as at 34, for reception of the member 31a which corresponds to the body 31.

It will be noted that the members 31 and 31a while serving as a valve seat also serve as a valve seat for the valve portion 24 of the head 23.

In FIG. 5 I have shown a slight modification. Mounted and projecting upwardly from the nut 35a which corresponds to the nut 35 is a head 39 having oppositely disposed spiral slots 40 formed therein. The valve stem 21a corresponds to 21 shown in FIG. 1 and extends into the head 39. Projecting outwardly from this valve stem 21a and through one of the slots 40 is a pin 41 carrying at its outer end an enlarged grip portion 42. To open or close the valve it would be but necessary to rotate the valve stem 21a by means of the member 42 and the member 41 to longitudinally move the valve stem 21a.

What I claim is:

1. In a faucet of the class described, a housing; an inlet passage leading into said housing; an outlet passage leading outwardly from said housing; a rotatable valve stem; a valve head at the end of said stem; a valve seat at the end of the inlet end of said passage leading into said housing; a yieldable valve head normally engaging said valve seat and closing the same and having a passage formed therethrough, said valve head on said stem being engageable with said yieldable valve head for closing the passage therethrough; a sleeve embracing the valve head on said stem and having a spirally directed slot on opposite sides thereof, diametrically opposite and in alignment with each other, said yieldable valve head being retained in the lower end of said sleeve, said sleeve having an outlet opening formed therein above said yieldable valve head for permitting flow of liquid from said yieldable valve head to the interior of said housing; means within said housing for retaining said sleeve in a position for retaining said yieldable valve head in engagement with said valve seat mounted in the said housing; and a pin projecting through said valve head on said stem and engageable in one of said spiral slots, to provide a right-hand valve and in the other slot to provide a left-hand valve, for moving said valve stem longitudinally when it is rotated for moving the valve head on the said valve stem into engagement and out of engagement with said yieldable valve head for controlling the flow of liquid from the passage in said yieldable valve head.

2. In a faucet of the class described, a housing; an inlet passage leading into said housing; an outlet passage leading outwardly from said housing; a rotatable valve stem; a valve head at the end of said stem; a valve seat at the end of the inlet end of said passage leading into said housing; a yieldable valve head normally engaging said valve seat and closing the same and having a passage formed therethrough, said valve head on said stem being engageable with said yieldable valve head for closing the passage therethrough; a sleeve embracing the valve head on said stem and having a spirally directed slot on opposite sides thereof, diametrically opposite and in alignment with each other, said yieldable valve head being retained in the lower end of said sleeve, said sleeve having an outlet opening formed therein above said yieldable valve head for permitting flow of liquid from said yieldable valve head to the interior of said housing; means within said housing for retaining said sleeve in a position for retaining said yieldable valve head in engagement with said valve seat mounted in the said housing; and a pin projecting through said valve head on said stem and engageable in one of said spiral slots for moving said valve stem longitudinally when it is rotated for moving the valve head on the said valve stem into engagement and out of engagement with said yieldable valve head for controlling the flow of liquid from the passage in said yieldable valve head; said pin being axially movable to engage either of said slots in said sleeve for rendering the mechanism operative for opening the valve upon movement of said stem either in a right-hand direction or a left-hand direction.

3. In a faucet of the class described, a housing; an inlet passage leading into said housing; an outlet passage leading outwardly from said housing; a rotatable valve stem; a valve head at the end of said stem; a valve seat at the end of the inlet end of said passage leading into said housing; a yieldable valve head normally engaging said valve seat and closing the same and having a passage formed therethrough, said valve head on said stem being engageable with said yieldable valve head for closing the passage therethrough; a sleeve embracing the valve head on said stem and having a spirally directed slot on opposite sides thereof, diametrically opposite and in alignment with each other, said yieldable valve head being retained in the lower end of said sleeve, said sleeve having an outlet opening formed therein above said yieldable valve head for permitting flow of liquid from said yieldable valve head to the interior of said housing; means within said housing for retaining said sleeve in a position for retaining said yieldable valve head in engagement with said valve seat mounted in the said housing; and a pin projecting through said valve head on said stem and engageable in one of said spiral slots for moving said valve longitudinally when it is rotated for moving the valve head on the said valve stem into engagement and out of engagement with said yieldable valve head for controlling the flow of liquid from the passage in said yieldable valve head; said pin being axially movable to engage either of said slots in said sleeve for rendering the mechanism operative for opening the valve upon movement of said stem either in a right-hand direction or a left-hand direction; and, a reduced neck-forming portion on said yieldable valve head snugly engaging the interior of said sleeve.

4. In a faucet of the class described, a housing; an inlet passage leading into said housing; an outlet passage leading outwardly from said housing; a rotatable valve stem; a valve head at the end of said stem; a valve seat at the end of the inlet end of said passage leading into said housing; a yieldable valve head normally engaging said valve seat and closing the same and having a passage formed therethrough, said valve head on said stem being engageable with said yieldable valve head for closing the passage therethrough; a sleeve embracing the valve head on said stem and having a spirally directed slot on opposite sides thereof, diametrically opposite and in alignment with each other, said yieldable valve head being retained in the lower end of said sleeve, said sleeve having an outlet opening formed therein above said yieldable valve head for permitting flow of liquid from said yieldable valve head to the interior of said housing; means within said housing for retaining said sleeve in a position for retaining said yieldable valve head in engagement with said valve seat mounted in the said housing; and a pin projecting through said valve head on said stem and engageable in one of said spiral slots for moving said valve stem longitudinally when it is rotated for moving the valve head on the said valve stem into engagement and out of engagement with said yieldable valve head for controlling the flow of liquid from the passage in said yieldable valve head; said pin being axially movable to engage either of said slots in said sleeve for rendering the mechanism operative for opening the valve upon movement of said stem either in a right-hand direction of a left-hand direction; the lower end of said sleeve being cut away to provide a larger diameter; and said yieldable valve head engaging at its periphery in said cut-away portion to retain said yieldable valve head in fixed relation to said sleeve.

5. In a faucet of the class described, a housing; an inlet passage leading into said housing; an outlet passage leading outwardly from said housing; a rotatable valve stem; a valve head at the end of said stem; a valve seat at the end of the inlet end of said passage leading into said housing; a yieldable valve head normally engaging said valve seat and closing the same and having a passage formed therethrough, said valve head on said stem being engageable with said yieldable valve head for closing the passage therethrough; a sleeve embracing the valve head on said stem, said yieldable valve head being retained in the lower end of said sleeve, said sleeve having an outlet opening formed therein above said yieldable valve head for permitting the flow of liquid from said yieldable valve head to the interior of said housing; means within said housing for retaining said sleeve in position for retaining said valve head in engagement with said valve seat mounted in said housing; a member stationary relatively to said housing and having a pair of diametrically opposite and aligned spiral slots formed therein; a pin projecting through one or the other of said slots to provide a right-hand or left-hand valve; and means for rotating said pin in said diametric slot for moving said valve stem longitudinally.

References Cited in the file of this patent
UNITED STATES PATENTS

| | | |
|---|---|---|
| 645,078 | Field | Mar. 13, 1900 |
| 1,354,965 | Gish | Oct. 5, 1920 |
| 2,477,127 | Holtz | July 26, 1949 |
| 2,634,944 | Waite | Apr. 14, 1953 |
| 2,703,584 | Mix | Mar. 18, 1955 |
| 2,796,079 | Hugg | June 18, 1957 |